(12) United States Patent
Nielsen et al.

(10) Patent No.: US 10,236,687 B2
(45) Date of Patent: Mar. 19, 2019

(54) FAULT TOLERANT WIND TURBINE CONVERTER SYSTEM

(71) Applicant: VESTAS WIND SYSTEMS A/S, Aarhus N (DK)

(72) Inventors: John Godsk Nielsen, Hornslet (DK); Søren Andersen, Tilst (DK); Lars Helle, Suldrup (DK); Duy Duc Doan, Tilst (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 15/566,025

(22) PCT Filed: Apr. 11, 2016

(86) PCT No.: PCT/DK2016/050103
§ 371 (c)(1),
(2) Date: Oct. 12, 2017

(87) PCT Pub. No.: WO2016/165720
PCT Pub. Date: Oct. 20, 2016

(65) Prior Publication Data
US 2018/0115163 A1    Apr. 26, 2018

(30) Foreign Application Priority Data
Apr. 16, 2015 (DK) .................. 2015 70223

(51) Int. Cl.
*H02J 3/34* (2006.01)
*H02J 3/36* (2006.01)
(Continued)

(52) U.S. Cl.
CPC ...... *H02J 3/34* (2013.01); *H02J 3/36* (2013.01); *H02J 3/386* (2013.01); *H02M 5/42* (2013.01);
(Continued)

(58) Field of Classification Search
CPC .......... H02M 5/42; H02M 5/45; H02M 5/451; H02M 2001/325; H02J 3/28; H02J 3/34; H02J 3/36
See application file for complete search history.

(56) References Cited

U.S. PATENT DOCUMENTS

| | | | |
|---|---|---|---|
| 7,476,987 B2* | 1/2009 | Chang ................ | H02J 3/28 290/55 |
| 2011/0140511 A1* | 6/2011 | Larsen .............. | H02J 3/02 307/2 |

(Continued)

FOREIGN PATENT DOCUMENTS

| | | |
|---|---|---|
| EP | 2858227 A1 | 4/2015 |
| WO | 01/084689 A1 | 11/2001 |

(Continued)

OTHER PUBLICATIONS

Danish Search Report for Application PA 201570223, dated Nov. 19, 2015.
International Search Report for Application No. PCT/DK2016/050103 dated Aug. 19, 2016.

*Primary Examiner* — Matthew Nguyen
(74) *Attorney, Agent, or Firm* — Patterson + Sheridan, LLP

(57) ABSTRACT

In a full-scale converter system both the grid-side inverter unit and the generator-side inverter unit have a series convection of parallel inverters and form a generator-side and grid-side voltage-center-point at a voltage level between those of the inverters connected in series. The voltage-center-points are electrically connected by a center-line conductor that has a cross-section between 30% and 70% of that of a positive or negative potential conductor. The converter system continues conversion operation in the event of a fault in an inverter of a first converter-string, with non-faulty inverters of the converter system, as the center- (Continued)

line conductor is dimensioned by said cross-section to carry a compensation current resulting from an unbalanced active power-output.

16 Claims, 9 Drawing Sheets

(51) Int. Cl.
*H02J 3/38* (2006.01)
*H02M 5/42* (2006.01)
*H02M 1/32* (2007.01)

(52) U.S. Cl.
CPC ...... *H02M 2001/325* (2013.01); *Y02E 10/763* (2013.01); *Y02E 60/60* (2013.01)

(56) References Cited

U.S. PATENT DOCUMENTS

| | | |
|---|---|---|
| 2013/0170254 A1* | 7/2013 | Letas .................... H02J 3/1892 363/34 |
| 2013/0182465 A1 | 7/2013 | Wang et al. |
| 2017/0358997 A1* | 12/2017 | Andersen ............ H02M 5/4585 |
| 2018/0262121 A1* | 9/2018 | Feddersen ............... H02M 1/32 |

FOREIGN PATENT DOCUMENTS

| | | |
|---|---|---|
| WO | 2013/007268 A2 | 1/2013 |
| WO | 2015055211 A1 | 4/2015 |

\* cited by examiner

FAULT TOLERANT WIND TURBINE CONVERTER SYSTEM

FIELD OF THE INVENTION

The invention relates to the field of wind-turbine full-scale converters, more specifically to wind-turbine full-scale converters that maintain partial power production even in the event of a fault of components of the wind-turbine full-scale converter.

SUMMARY OF THE INVENTION

According to a first aspect, a full-scale converter system is provided for converting active power produced by a generator of a variable speed wind turbine to be fed into an electricity-grid. The converter system comprises a converter system controller, grid-side inverter unit and a generator-side inverter unit. Both the grid-side inverter unit and the generator-side inverter unit comprise a series connection of parallel inverters. The inverters of the grid-side inverter unit and the generator-side inverter unit at a same voltage level of the series connections together forming first and second converter strings. The grid-side inverter unit and the generator-side inverter unit are connected back to back on their DC sides by a positive potential conductor and a negative potential conductor to form a common DC link, the positive and negative potential conductors having cross-sections, wherein the generator-side and grid-side inverter form a generator-side and grid-side voltage-center-point, respectively, at a voltage level between the inverters connected in series. The voltage-center points are electrically connected by a center-line conductor. The center-line conductor has a cross-section between 30% and 70% of the cross-section of either the positive potential conductor or the negative potential conductor, whichever has the smaller cross-section. The converter system controller is programmed to continue conversion operation, in the event of a fault of an inverter of the first converter-string, with non-faulty inverters of the first and second converter strings, causing unbalanced active power-output between the first and second converter-strings, as the center-line conductor is dimensioned by said cross-section to carry a compensation current resulting from the unbalanced active power-output caused by the fault.

According to a second aspect, a method of controlling a full-scale converter system is provided for converting active power produced by a generator of a variable speed wind turbine to be fed into an electricity-grid. The converter system comprises a grid-side inverter unit and a generator-side inverter unit, both the grid-side inverter unit and the generator-side inverter unit comprising a series connection of parallel inverters. The inverters of the grid-side inverter unit and the generator-side inverter unit at a same voltage level of the series connections together forming first and second converter strings, wherein the grid-side inverter unit and the generator-side inverter unit are connected back to back on their DC sides by a positive potential conductor and a negative potential conductor to form a common DC link, the positive and negative potential conductors having cross-sections, wherein the generator-side and grid-side inverter form a generator-side and grid-side voltage-center-point, respectively, at a voltage level between the inverters connected in series. The voltage-center-points are electrically connected by a center-line conductor. The center-line conductor has a cross-section between 30% and 70% of the cross-section of either the positive potential conductor or the negative potential conductor, whichever has the smaller cross-section. The method comprises continuing conversion operation, in the event of a fault of an inverter of the first converter-string, with non-faulty inverters of the first and second converter strings, causing unbalanced active power-output between the first and second converter-strings, as the center-line conductor is dimensioned by said cross-section to carry a compensation current resulting from the unbalanced active power-output caused by the fault.

GENERAL DESCRIPTION, ALSO OF OPTIONAL EMBODIMENTS

According to a first aspect, a full-scale converter system is provided for converting active power produced by a generator of a variable speed wind turbine to be fed into an electricity-grid.

The full-scale converter thereby converts variable frequency current, the frequency of which depends on wind speed, into fixed frequency current, e.g. 50 Hz current, to be fed into an electrical grid. A full-scale converter is a converter that converts 100% of the variable frequency power-output of the generator into fixed-frequency active power, when regarding conversion losses as negligible.

The full-scale converter comprises a converter system controller that is programmed to control the full-scale converter system. The full-scale converter further comprises a grid-side inverter unit and a generator-side inverter unit. The generator-side inverter unit is, for example, coupled to a generator and the grid-side inverter-unit is, for example, coupled to a transformer.

Both the grid-side inverter unit and the generator-side inverter unit comprise a series connection of parallel inverters. The generator-side inverter unit functions as a rectifier converting variable frequency AC-current into DC-current, whereas the grid-side inverter is used for converting DC-current to a fixed frequency AC-current.

Hence, for example, at least two inverters of the generator-side inverter unit are connected to each other in parallel, wherein these parallel-connected inverters are connected in series to at least two other generator-side inverters of the generator-side inverter unit that are connected to each other in parallel. Likewise, at least two inverters comprised by the grid-side inverter unit are connected to each other in parallel, wherein these parallel-connected grid-side inverters are connected in series to at least two other grid-side inverters comprised by the grid-side inverter unit that are connected to each other in parallel.

The inverters of the grid-side inverter unit and the generator-side inverter unit at a same voltage level of the series connections together form a converter string.

Hence, for example, the generator-side inverter unit, for example, comprises parallel-connected generator-side inverters that operate at a positive potential, also referred to herein as generator-side inverters of a positive converter string. These generator-side inverters of the positive converter string are connected in series to parallel-connected generator-side inverters that operate at a negative potential, also referred to herein as generator-side inverters of a negative converter string.

The grid-side inverter unit and the generator-side inverter unit are connected back to back on their DC sides by a positive potential conductor and a negative potential conductor to form a common DC link. The positive potential conductor and the negative potential conductor are both, for example, realized as cables with copper cable-cores. The positive potential conductor and the negative potential conductor each have a cross-section.

The generator-side and grid-side inverter form a generator-side and grid-side voltage-center-point, respectively, at a voltage level between the inverters connected in series.

The voltage-center-points, lying, for example, at neutral potential, are formed, for example, by connecting the negative-potential inverters of the generator-side inverter unit to the positive potential-inverters of the generator-side inverter unit and by connecting the negative-potential inverters of the grid-side inverter unit to the positive-potential inverters of the grid-side inverter unit.

The generator-side and grid-side voltage-center-points are electrically connected by a center-line conductor.

Thereby, the inverters connected to the positive potential conductor as well as to the center-line conductor form, for example, a first converter-string lying on positive potential (positive converter string). Likewise, the inverters connected to the negative potential conductor as well as to the center-line conductor form, for example, the second converter-string lying on negative potential (negative converter string). However, the assignment of "first" and "second" to a positive converter-string or negative converter string is interchangeable.

The center-line conductor has a cross-section between 30% and 70% of the positive potential conductor or the negative potential conductor, whichever has the smaller cross-section. To provide an example, if the positive-potential conductor has a cross-section of 500 mm$^2$, and the negative-potential conductor has a cross-section of 400 mm$^2$ the center-line conductor has a cross-section in a range from 120 mm$^2$ to 280 mm$^2$, i.e. from 30% to 70% of 400 mm$^2$.

The term cross-section of the positive or negative potential conductor refers herein to an overall cross-section of all conductive elements that form the positive potential conductor since the positive potential conductor as well as the negative potential conductor can be formed, for example, by a single cable with only one cable-core serving as the positive potential conductor or a plurality of cables or a cable with a plurality of cable-cores. The cross-section of, for example, all these cable cores conducting the positive or negative potential current are to referred to herein as the cross-section of the positive or negative potential conductor.

The converter system controller is programmed to continue conversion operation, in the event of a fault of an inverter of the first converter-string, with non-faulty inverters of the converter system.

Conversion operation is referred to herein as the process of converting the variable frequency AC-output power of the generator, fed to the full-scale converter, to the fixed frequency AC-power output of the full-scale converter, fed into the electricity-grid.

Continuing conversion operation with the non-faulty inverters in the event of a fault of an inverter of the first converter-string causes an unbalanced active power-output between the first and second converter-strings.

In order to continue operation also in the event of such an unbalanced active power-output, the center-line conductor is dimensioned to carry a compensation current resulting from the unbalanced active power-output of the first and second converter-string caused by the fault, more precisely, by the fault of the inverter of the first converter-string.

The center-line conductor is dimensioned to carry this compensation current by dimensioning the cross-section of the center-line conductor to be between 30% and 70% of either the positive potential conductor or the negative potential conductor, whichever has the smaller cross-section. In some embodiments the center-line conductor has a cross-section closer to 50% of that of the positive or negative potential conductor, for example a cross-section between 40% and 60%, or between 45% and 55% of either the positive potential conductor or the negative potential conductor, whichever has the smaller cross-section.

The first converter string is, for example, equipped with two generator-side inverters and two corresponding grid-side inverters, for example, coupled together by the positive potential conductor and the second converter string is equipped with two generator-side inverters and two corresponding grid-side inverters, the generator-side and grid-side inverters of the first and second converter string have an equal maximum active power-output.

The maximum active power-output of the first converter-string is reduced by 50%, for example, in the event of a fault of a generator-side inverter of the first converter string.

The maximum active power-output of the second converter-string is, for example, not changed by the fault of the generator-side inverter of the first converter string and is still 100% of the maximum active power-output.

Due to the fault of the generator-side inverter of the first converter string, the maximum active power-output of the full-scale converter is now reduced to 75% of the original maximum active power-output of the full-scale converter system, in this example.

Hence, in the worst case, if both converter-strings perform conversion operation with their respective maximum active power-output, as in the above example, the compensation current would correspond to 25% of the total maximum active power-output of the full-scale converter (50% of the maximum active power-output of the first converter string), transported at a given DC-link voltage of the first and second converter-string.

The given DC-link voltage of the corresponding first converter-string is, for example, given by a DC-voltage between the positive potential conductor and the center-line conductor (lying on the voltage-center-point potential, e.g. on neutral potential). Likewise the given DC-link voltage of the second converter-string is, for example, given by a DC-voltage between the negative potential conductor and the center-line conductor (lying on neutral potential). The given DC-link voltage of the first/second converter-string is, for example, equal for both converter-strings and is not changed, when performing conversion-operation with the reduced maximum active power-output.

The compensation current is then given by dividing 50% of the maximum active power-output of the first converter string by the given DC-link voltage of the first converter string.

The center-line conductor is dimensioned to carry such a compensation current. Therefore, its cross-section is not chosen to be negligible compared to the positive- or negative potential conductor, but rather to have a cross-section that is at least 30% of the positive or negative potential conductor, whichever has the smaller cross-section. The center-line conductor is thereby dimensioned to carry the compensation current by cross-section as the resistance of the center-line conductor decreases linearly in proportion to its cross-section, and power-dissipation, associated with produced heat, is proportional to the resistance of the center-line conductor.

However, the center-line conductor is dimensioned to have a smaller cross-section than the positive or negative potential conductors, as compensation currents that would require to dimension the cross-section of the center-line conductor to be equal to the cross-section of the positive or negative potential conductor would only occur, if indeed all the converter-units of a converter string are faulty. Such severe faults, for example, are hard to handle anyway and would typically require a wind-turbine shutdown.

The compensation current caused by an unbalanced active power-output of two converter strings corresponds, for example, to a difference between (i) the DC current flowing along the positive potential conductor, resulting from power converted by the positive converter-string and (ii) DC current flowing along the negative potential conductor, resulting from power converted by the negative converter-string. If this difference was zero, corresponding to an equal power-production of the positive converter-string and the negative converter-string, currents flowing along the center-line conductor, flowing from positive potential to zero potential and from zero potential to negative potential, would cancel each other out. However, when this difference is not zero, one of these two currents prevails and a net-current flow, i.e. the compensation current, over the center-line conductor occurs.

This compensation current can cause damage to the center-line conductor as well as overheating of the entire converter-system due to an overheating of the center-line conductor.

However, the converter-system is, for example, capable of converting the maximum amount of power convertible by the non-faulty inverters, irrespective of the compensation current by dimensioning the center-line conductor as described above.

In some embodiments the converter system controller is programmed to disable a faulty generator-side or grid-side inverter and to disable a generator-side inverter of a converter-string in the event of a fault of a grid-side inverter of the converter string and to disable a grid-side inverter of the converter string in response to a fault of a generator-side inverter of the converter string.

In the event of a fault of a generator-side or grid-side inverter, the generator-side or grid-side inverter is, for example, disabled.

Disabling an inverter comprises, for example, shutting down the inverter and disconnecting the inverter from the generator or the transformer, depending on whether the inverter is a generator-side or a grid-side inverter. Hence, the conversion operation of the full-scale converter is continued with a reduced maximum active power-output due to this fault using the non-faulty, and thereby not-disabled, generator-side or grid-side inverters.

To prevent further damage to inverters of a converter string due to a fault in either the grid-side inverter or the generator-side inverter of the converter-string, for example, when a grid-side inverter suffers a fault, not only the faulty grid-side inverter of the converter string is disabled but also a corresponding generator-side inverter of the converter string is disabled. Likewise, when a generator-side inverter suffers a fault, not only the faulty generator-side inverter of the converter string is disabled but also a corresponding grid-side inverter of the converter string is disabled.

Hence, if, for example, a non-faulty generator-side inverter of a converter string was not disabled in the event of a faulty grid-side inverter unit of a converter string, the other grid-side inverters of the converter-string would, for example, receive an DC-input current that exceeds their maximum admissible DC input current, as the faulty grid-side inverter cannot feed fixed-frequency AC voltage, inverted from received DC voltage, to the grid anymore. Thereby the entire DC-input current is received by the remaining (non-faulty) grid-side inverters of the converter-string, leading, for example, to the exceeding of the maximum DC input current for the remaining non-faulty inverters.

In order to be able to disable a faulty generator-side or grid-side inverter and also corresponding further generator-side and grid-side inverters, as described above, the converter control system of the full-scale converter is programmed to detect a fault of a generator-side or grid-side inverter. The fault of such an inverter is monitored, for example, by temperature sensors that monitor temperature of an inverter and declare a converter unit to be faulty if at least one of the converter units' temperature exceeds a given threshold for a given period of time. A fault a converter-unit could also be detected by current, voltage and/or power sensors placed upstream and downstream (in current flow) from an inverter or the entire converter unit. If, for example, a difference between an AC-input current and a DC-output current of a generator-side inverter exceeds a given threshold, although control-parameters transmitted to the generator-side inverter remain constant, the generator-side inverter is declared to be faulty.

In some embodiments, the converter system controller is programmed to disable a generator-side inverter by disconnecting the generator-side inverter from the generator and to disable a grid-side inverter by disconnecting the grid-side inverter from the transformer by circuit breakers.

For example, a generator-side circuit breaker is provided for each generator-side inverter. Likewise, for example, a grid-side circuit breaker is provided for each grid-side inverter.

The circuit breakers are, for example, mechanical switches, coupled to fault sensors, such as the voltage/current sensors or temperature sensors described above. These switches physically disconnect current paths which branch off from the current path connecting the full-scale converter as a whole to the generator and to the transformer, wherein these branched-off current paths are the current paths leading to the generator-side or grid-side inverters.

In some embodiments the full-scale converter is provided with fuses in addition to the circuit breakers.

Additional to these circuit breakers, fuses are, for example, provided in the current path(s) leading to the generator-side and grid-side inverters. These fuses disconnect said current paths in the event of an overcurrent, for example, due to specific faults, such as a short circuit in either or both one generator-side and/or one grid-side inverter of a converter string, leading to an overcurrent that actuates the fuses.

Providing the current paths with fuses as well as with circuit breakers makes it possible to disconnect the current paths within fractions of seconds, i.e. faster than it would be possible with conventional circuit breakers, for example, in the event of the above-mentioned overcurrent.

In some embodiments the cross-section of the center-line conductor is dimensioned to be 50% of the cross-section of the positive or negative potential conductor, whichever has the smaller cross section, and the converter controller is programmed to continue operation in the event that up to 50% of the generator-side or grid-side inverters of the first or second converter string are faulty, while the other inverters of the full-scale converter are non-faulty, wherein conversion operation is continued with a maximum conversion capability of the non-faulty inverters.

In the event of a fault of 50% of the generator-side or grid-side inverters of a converter-string, the maximum active output-power of that converter string is reduced by 50%, when, for example, the faulty converter-units are disconnected or shut down (if possible) in response to a fault.

The center-line conductor is, for example, dimensioned to carry a compensation current corresponding, in the worst case (i.e. when both converter strings are operated at their maximum active power-output, provided that the DC-link voltage of the converter-string has not changed due to the fault) to 50% of the current flowing along the positive potential conductor as this current flows along the center-line conductor in the event of such a fault.

Hence, for example, the cross-section of the center-line conductor is chosen to be 50% of the cross-section of the positive potential conductor to enable the full-scale converter to continue conversion operation at 50% of the maximum active power-output of the full-scale converter.

In some embodiments the center-line conductor is a copper core of a cable with a cross-section dimensioned to carry the compensation current.

The center-line conductor, for example, is suitable to carry the compensation current a cross-section is chosen with respect to pertinent norms, such as the European norm for 0.6/1 kV to 18/30 kV power lines DIN VDE 0276-1000. Thereby a cross-section in the range between 30% and 70% of the cross-section of the positive potential conductor or the negative potential conductor is chosen that carries an expected compensation current caused by a fault of at least one grid-side or generator-side inverter of a converter unit.

The compensation current can be found by dividing this maximum active power-output of the faulty (disconnected) inverters by the given DC-link voltage of the converter-string comprising the disconnected generator-side and corresponding grid-side inverters.

With a compensation current I that is expected when a certain number of converter-units suffer a fault, calculated as described above, the cross-section of the copper core of the cable is, for example, calculated using the following formula:

$$A = \frac{2LI}{\kappa U}$$

wherein, L is the length of the DC-link [m], I is the expected compensation current [A], U is the maximum admissible loss of DC-link voltage of the converter-string [V] and $\kappa$ is the specific conductivity of copper [56 m/$\Omega$ mm$^2$] and the result A is the cross-section [mm$^2$].

Should this calculated cross-section, for example, be smaller than 30% of the cross-section of the positive or negative potential conductor—whichever has the smaller cross-section—the cross-section of the center-line conductor is, for example, set to 30% of this cross-section, as this cross-section is seen herein as a lower limit for the cross-section of the center-line conductor to continue conversion operation safely, also in the event of a fault.

The cross-section resulting from this formula might still have to be adjusted by further factors, if required by a pertinent norm, such as DIN VDE 0276-1000.

In some embodiments the cable comprises an insulation layer, surrounding the copper core.

The center-line conductor, realized as a copper core of a cable, is, for example, surrounded by an insulation layer comprising polyvinyl chloride (PVC), cross-linked polyethylene or other insulation materials suitable for insulating medium to high voltage cables, e.g. 100V to 10 kV, carrying a current of, e.g. 1 to 10 kA.

The insulation layer surrounding the center-line conductor, realized as the copper core of a cable, ensures that there is no electrical contact between the center-line conductor and the positive potential or negative potential conductor, as this could cause a short-circuit of the converter-system. Furthermore an electrical contact between conductive parts of a tower or a nacelle of the wind turbine and the center-line conductor is also prevented by that insulation layer, as if there was a compensation current present on the center-line conductor in the case of such a contact, an undesired current flow along a nacelle or the tower of the wind turbine occur.

The insulation layer also provides for a thermal insulation of the center-line conductor, realized as the copper core surrounded by that insulation layer. As electrically insulating materials have, in general, a lower thermal conductivity than highly conductive materials, the heat transport from the center-line conductor due to current flow along the center-line conductor is reduced.

In some embodiments the positive potential conductor and the negative potential conductor are copper cores of cables comprising insulation layers surrounding the respective copper cores of the cables, wherein the insulation layers of the negative potential conductor, the positive potential conductor and the center connection line are spatially separated from each other, i.e. the corresponding cables of the full-scale converter are routed separately from each other from the generator-side inverter unit to the grid-side inverter unit.

To provide an example, three cables, namely the positive potential conductor, the negative potential conductor and the center-line conductor are routed spatially separated from each other from the generator-side inverters to the grid-side inverters. Each of these separate cables comprises separate copper cores and separate insulation layers.

However, the positive potential conductor and the negative potential conductor can also be formed by two or more cable cores. Hence, for example, the positive potential conductor is formed by two cables comprising two corresponding cable cores. Likewise, the negative potential conductor is then formed by two cables comprising two respective cable cores. The cross-section of the center-line conductor is then dimensioned to be at least 30% and not more than 70% of an added up cross-sections of the two cable cores serving as the positive potential conductor, a total cross-section given by cross-section of cable A and cross-section of cable B of the center-line conductor.

In some embodiments the positive potential conductor, the negative potential conductor and the center connection line are embedded in a common insulation layer. The common insulation layer, for example, comprising polyvinyl chloride (PVC), cross-linked polyethylene, surrounds and embraces these conductors and guides them from the generator-side inverter unit to the grid-side inverter unit. Therefore, the common insulation layer and the conductors embedded within form a DC-link cable.

As the positive potential conductor, the negative potential conductor, each formed by one or more cable-cores, and the center connection line are embraced by this common insulation layer, they are physically linked to each other in this DC-link cable. Hence, bending forces acting on the DC-link cable resulting from routing the DC-link cable from the generator-side inverter unit to the grid-side inverter unit, affect the physically linked conductors in the same way, as for example, their bending radius is substantially the same.

Furthermore, the positive potential conductor, the negative potential conductor and the center connection line can be routed from the generator-side inverter unit to the grid-side inverter unit by routing the DC-link cable through a single cable duct.

In some embodiments the cross-section of the positive potential conductor and the cross-section of the negative potential conductor and the cross-section of the positive potential conductor are equal.

The cross-section of the center-line conductor is chosen to be at least 30% and not more than 70% of the positive potential conductor or the negative potential conductor, whichever has the smaller cross section.

When the cross-sections of the positive and negative potential conductor are equal, the cross-section of the center-line conductor is chosen to be at least 30% and not more than 70% of a common cross-section of both conductors.

Performing conversion operation at equal maximum active power-output for both the first and second (positive and negative) converter strings results in an equal current flow over the positive and negative potential conductor, provided the DC-voltage of the positive converter string is the same as the DC-voltage of the negative converter string. Therefore, for example, the cross-section of the positive and negative potential conductor conductors are equal.

In some embodiments the generator-side inverter unit is arranged in a nacelle of the wind-turbine and the grid-side inverter unit is arranged at the base of a tower of the wind turbine.

In this way, the weight of the nacelle is reduced, which in turn reduces stress and wear of yaw bearings of the tower carrying the nacelle. Furthermore, as each inverter is also a heat source, the overall temperature in the nacelle acting on heat-sensitive semiconductor parts of the inverters is reduced by placing the grid-side inverter outside the nacelle.

When the grid-side and the generator-side inverters are located remotely like that, the center-line conductor, the positive potential conductor and the negative potential conductor extend from the nacelle to the base of the tower of the wind turbine, along the tower of the wind turbine and are therefore elongated conductors. These elongated conductors are, as described above, for example embedded in either separate isolation layers or in a common insulation layer.

In some embodiments the converter controller is programmed to cause the full-scale converter system to dissipate power produced by a generator-side inverter of a converter-string in the event of a fault in a grid-side inverter of the said converter-string, when a generator-side inverter of said converter-string is disabled.

As mentioned above, an exemplary full-scale converter is equipped with at least two generator-side inverters of a generator-side inverter unit connected to respective grid-side inverters of a grid-side inverter unit of the same potential in the first and second converter string, In the event of a fault of a grid-side inverter of a converter string without there being a fault of a generator-side inverter of the converter string, the grid-side inverter(s) of the converter-string receive a DC input-current that might exceed their maximum admissible input-current, even though the received current is distributed equally to the remaining grid-side inverters as they are connected in parallel.

To avoid this, for example, a protection mechanism is provided for the remaining grid-side inverters in such a case: the full-scale converter comprises, for example, switchable energy-dissipation elements that are actuated by the converter system controller that is programmed to actuate these energy-dissipation elements in the course of disabling the generator-side and the grid-side inverters, when a fault of a grid-side inverter has been detected in the corresponding converter-string.

In some embodiments the power produced by the generator is dissipated by energy-dissipation units that are located in the common DC-link. These energy-dissipation units, are, for example, realized as high Ohmic, e.g. 100 MΩ, switchable resistive elements that are connected to the positive/negative potential conductor on the one side and, for example, to earth potential on the other side by a switch that is closed in the event of a fault of a generator-side inverter. The number of resistive elements activated may depend on the number of generator-side inverters that have suffered a fault.

The converter control system of the full-scale converter thereby causes the full-scale converter-system to dissipate excess power as in the scenario described above. This energy dissipation arrangement is, for example, actuated by the converter control system before shutting down and/or disconnecting the generator-side inverter in the course of disabling the faulty inverter, as although the generator-side inverter is shut down and/or disconnected, for example, some non-zero power-flow through the generator-side inverter might still occur until the faulty generator-side inverter is fully disconnected. The wind-turbine generator's active power output, fed to the full-scale converter system, is reduced by wind-turbine rotor blades being pitched out of the wind.

In some embodiments the converter controller is programmed to disable only at least one generator-side inverter of a converter-string in the event of a fault of at least one generator-side inverter of the converter-string, while keeping the grid-side inverters of the converter-string in operation to enable reactive-power production by the grid-side inverters.

Thereby, the grid-side inverters, which were, as described not shut down or disconnected, produce reactive power by converting the DC power produced by the non-faulty generator-side inverters into reactive power.

The converter-system is then capable of producing rated reactive power at least, for example, until the energy stored in a capacitor connected with the faulty generator-side inverter has been consumed.

By keeping the non-faulty grid-side inverters of a converter-unit in operation, the wind turbine full-scale converter can actively participate in regulating grid voltage and/or compensating voltage dips in the grid by its full reactive power production capability at least for some time, even in the event of a fault of at least one generator-side inverter of a converter unit.

According to a second aspect, a method of controlling a full-scale converter system is provided for converting active power produced by a generator of a variable speed wind turbine to be fed into an electricity-grid. The converter system comprises a grid-side inverter unit and a generator-side inverter unit, both the grid-side inverter unit and the generator-side inverter unit comprising a series connection of parallel inverters. The inverters of the grid-side inverter unit and the generator-side inverter unit at a same voltage level of the series connections together forming first and second converter strings, wherein the grid-side inverter unit and the generator-side inverter unit are connected back to back on their DC sides by a positive potential conductor and a negative potential conductor to form a common DC link, the positive and negative potential conductors having cross-sections, wherein the generator-side and grid-side inverter form a generator-side and grid-side voltage-center-point, respectively, at a voltage level between the inverters connected in series. The voltage-center-points are electrically connected by a center-line conductor. The center-line conductor has a cross-section between 30% and 70% of either the positive potential conductor or the negative potential conductor, whichever has the smaller cross-section. The method comprises continuing conversion operation, in the event of a fault of an inverter of the first converter-string, with non-faulty inverters of the first and second converter strings causing unbalanced active power-output between the first and second converter-strings, as the center-line conductor is dimensioned by said cross-section to carry a compensation current resulting from the unbalanced active power-output caused by the fault.

The method can be performed with a full-scale converter system according to any embodiment described above.

BRIEF DESCRIPTION OF THE DRAWINGS

Exemplary embodiments of the invention are now described, also with reference to the accompanying drawings, wherein.

The drawings and the description of the drawings are of examples of the invention and are not of the invention itself. Like reference signs refer to like elements throughout the following description of embodiments.

DESCRIPTION OF EMBODIMENTS

Figure 1:
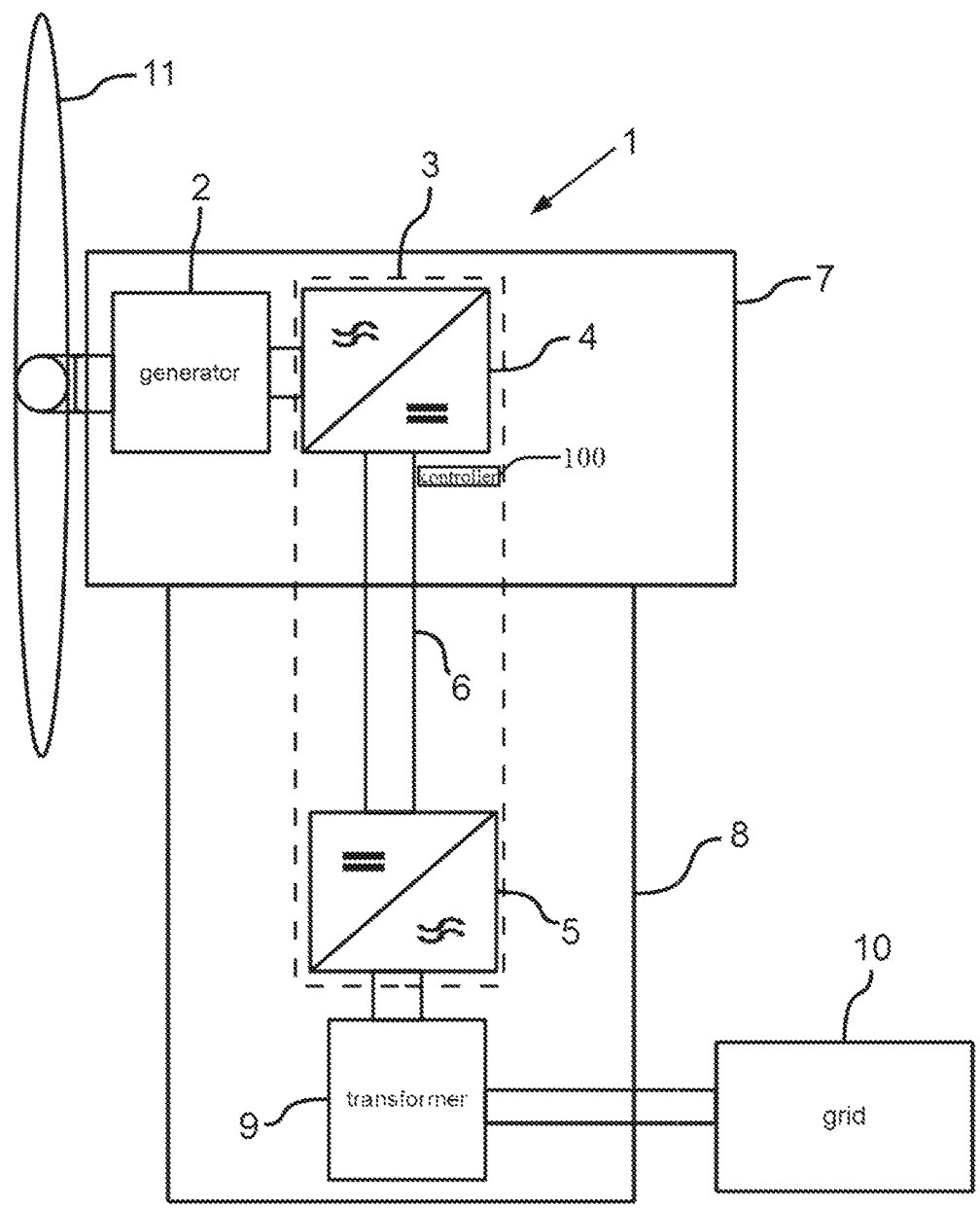
FIG. 1 is a schematic illustration of a wind turbine with a split (one inverter unit located in the nacelle, the other inverter unit located in the tower) full-scale converter.

The wind turbine 1, schematically illustrated by FIG. 1 has a generator 2, located in a nacelle 7, driven by a wind turbine rotor 11. The generator 2 produces variable frequency AC-output power that is fed to a generator-side inverter unit 3, also located in the nacelle 7. The generator-side inverter unit 3 converts the variable frequency AC-current into DC-current that is transferred to a grid-side inverter unit 5, located at the base of the tower 8. The grid-side inverter unit 5 converts the DC-current into fixed frequency AC-current. The generator-side inverter unit 3, the DC-link 6 and the grid-side inverter unit 5 together form a full-scale converter 3 that is controlled by a converter system controller 100. The fixed-frequency AC-current-output of the grid-side inverter 5 is fed to a transformer 9 before it is fed into an electricity-grid 10.

Figure 2:
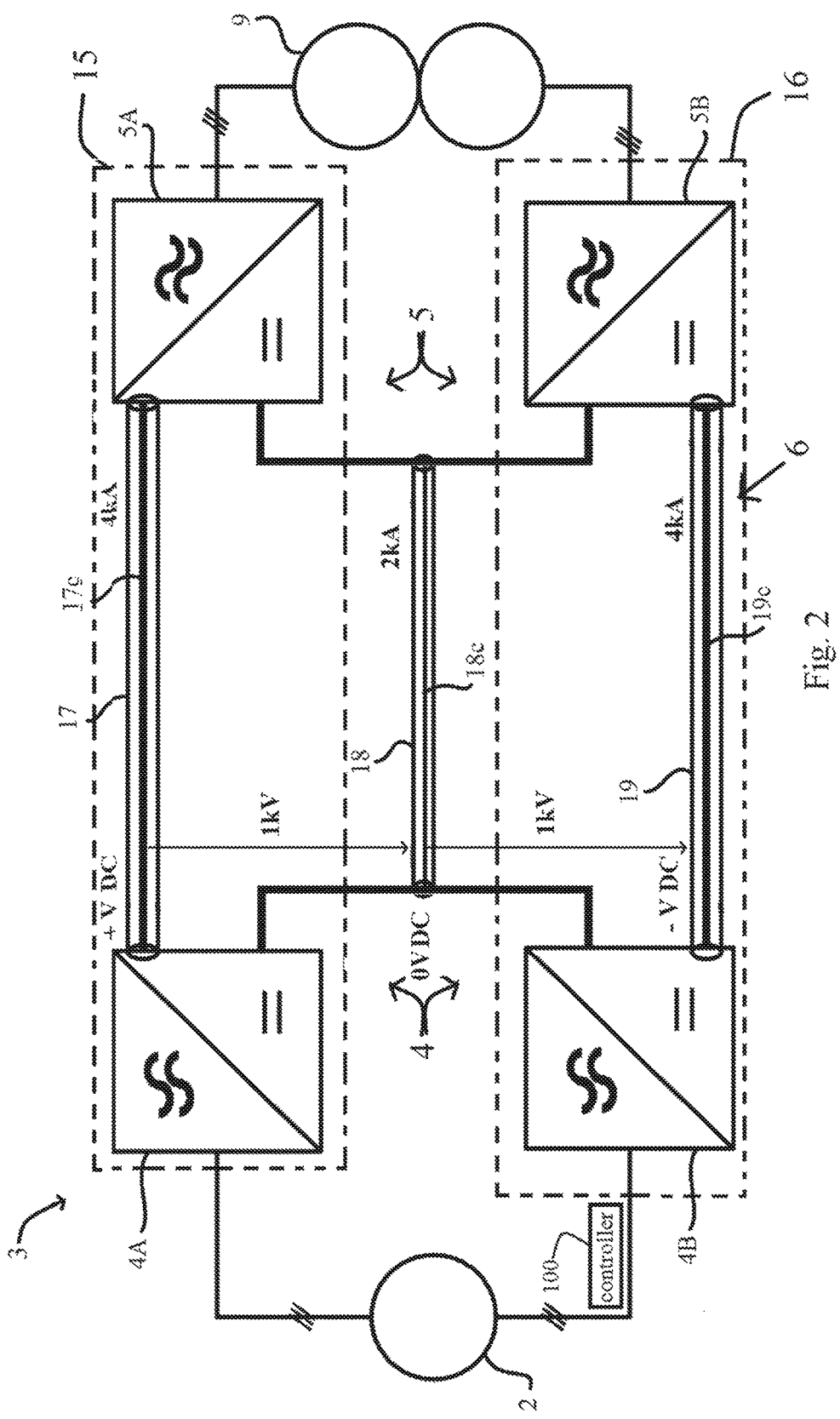
FIG. 2 is a schematic illustration of the full-scale converter with a DC-link formed by a positive potential-, negative potential- and a center-line conductor.

A full-scale converter 3 with a DC-link 6 formed by three separated cables is schematically illustrated by FIG. 2. The generator 2 comprises two separate generator-windings, a first generator-winding is connected to a first generator-side inverter 4A lying at a positive potential and a second generator-winding is connected to a second generator-side inverter 4B lying at a negative potential. The first generator-side inverter 4A and the second generator-side inverter 4B are connected in series and thereby form a generator-side inverter unit 4. Likewise, there is a first grid-side inverter 5A, lying on positive potential, connected to a first separate transformer winding of a transformer 9, connected in series to a second grid-side inverter 5B, lying on negative potential, that, in turn is connected to a second separate transformer winding.

The series connections form a mid-voltage point that lies, in the example of FIG. 2, at a potential of 0V DC and therefore on neutral potential. The generator-side inverter 4A and the grid-side inverter 5A that lie on a positive potential corresponding to 1 kV to a mid-voltage point, are connected via a positive potential cable 17, comprising a cable core, serving as a positive potential conductor 17c. The positive potential conductor is dimensioned to carry a 4 kA current at 1 kV voltage. These inverters 4A and 5A and the positive potential conductor form a positive converter string (first converter string) 15 encircled by a dashed-line box. In the same way, the generator-side inverter 4B and the grid-side inverter 5B that lie on a negative potential corresponding to 1 kV to the mid-voltage point, are connected via a negative potential cable 17, comprising a cable core, serving as a negative potential conductor 19c. Also the negative potential conductor is dimensioned to carry a 4 kA current at 1 kV voltage. These inverters 4B and 5B and the negative potential conductor form a negative converter string (second converter string) 16, also encircled by a dashed-line box.

The voltage-center-point of the generator-side series connection between the generator-side inverters 4A and 4B and the series connection between the grid-side inverters 5A and 5B is connected by a center-line cable 18, comprising a cable core, serving as the center-line conductor 18c. The center-line conductor 18c is dimensioned to carry a 2 kA current. In this example, the cross-section of the center-line conductor is the cross-section of the positive and negative potential conductor divided by two. The positive potential cable 17, the negative potential cable 19 and the center-line cable 18 together form the common DC-link 6.

Conversion operation performed by the full-scale converter system of FIG. 2 is controlled by the converter system controller 100 that is programmed to continue conversion operation also in the event of a fault of a generator-side 4a, 4b, 4c, 4d or grid-side inverter 5a, 5b, 5c, 5d of a converter string 15, 16.

Figure 3:
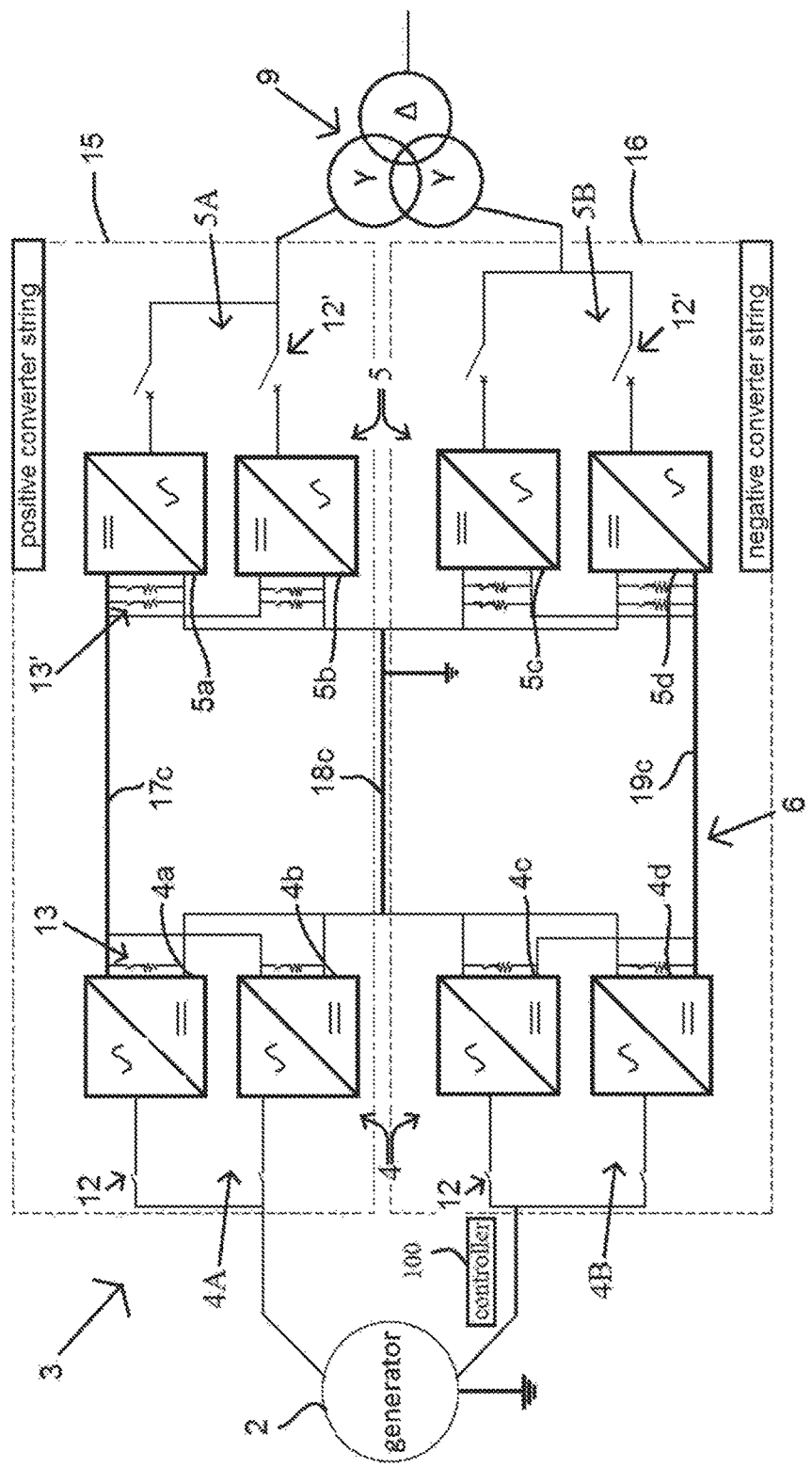
FIG. 3 is a schematic detail circuit diagram of the full-scale converter of FIG. 2.

The converter system of FIG. 2 is illustrated in more detail in conjunction with FIG. 3. The generator-side inverter unit 4 comprises a generator-side inverter 4A lying on positive potential and a generator-side inverter 4B lying on negative potential, wherein these generator-side inverters 4A and 4B are connected in series. The generator-side inverter 4A, lying on positive potential, is formed by two generator-side inverters 4a and 4b connected in parallel. Also the generator-side inverter 4B, lying on negative potential is formed by two generator-side inverters 4c and 4b connected in parallel. Hence, the parallel-connected generator-side inverters 4a and 4b are connected in series to the parallel-connected generator-side inverters 4c and 4d to form the generator-side inverter unit 4. Likewise the grid-side inverter unit 5 comprises a grid-side inverter 5A, lying on positive potential, and a grid-side inverter 5B lying on negative potential that are connected in series to each other. The grid-side inverter 5A, lying on positive potential, comprises two grid-side inverters 5a and 5b connected in parallel, and the grid-side inverter 5B, lying on negative potential, comprises two grid-side inverters 5c and 5d connected in parallel. Thereby the grid-side inverter unit 5 is formed by two parallel-connected grid-side inverters 5a and 5b that are connected in series to two parallel-connected grid-side inverters 5c and 5d. The positive and negative converter strings are formed by the generator-side inverter unit 4 and the grid-side inverter unit 5 as described in conjunction with FIG. 2.

The generator-side inverter unit 4 is equipped with circuit breakers 12 to disconnect a faulty generator-side inverter from the generator 2 and with generator-side energy-dissipation units 13 to dissipate energy, for example, in the event of a fault of a grid-side inverter of the grid-side inverter unit 5. Likewise, the grid-side inverter is equipped with circuit breakers 12' to disconnect a faulty grid-side inverter of the grid-side inverter unit 5 from the transformer 9 and with grid-side energy dissipation units 13'. The grid-side and generator-side energy dissipations units 13, 13' are located in the common DC-link 6. The cross-sections of the positive potential conductor 17c, the negative potential conductor 19c and the center-connection line 18c are chosen as described in conjunction with FIG. 2.

The converter system controller 100 is programmed to control conversion operation performed by the converter system described above, the circuit breakers 12, 12' and the energy dissipation units 13, 13'. The converter system controller 100 is programmed to continue conversion operation also in the event of a fault of a generator-side 4a, 4b, 4c, 4d or grid-side inverter 5a, 5b, 5c, 5d of a converter string 15, 16.

Figure 4:
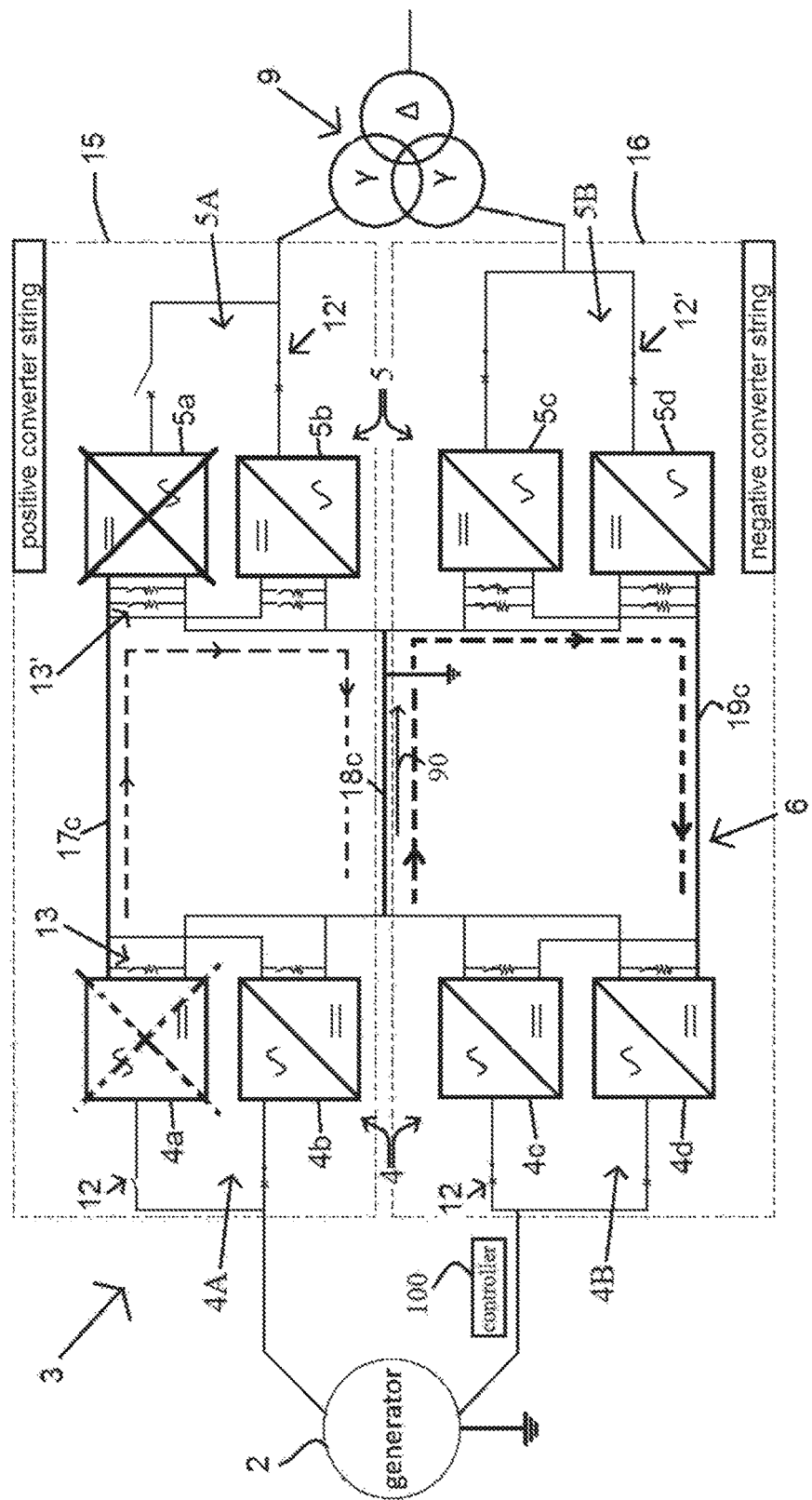
FIG. 4 is a schematic circuit diagram of the full-scale converter of FIG. 3, with a faulty and disabled grid-side inverter and a generator-side inverter of the same converter string having been disabled in response to that fault.

The activities of the converter system 3, controlled by the converter control system 100 that are carried out in response to a fault of a grid-side inverter 5a of the positive converter string 15 are illustrated by FIG. 4. In response to the fault of the grid-side inverter 5a the converter controller 100 causes a grid-side circuit breaker 12', coupling the faulty grid-side inverter 5a to the transformer 9, to disconnect the faulty grid-side inverter 5a from the transformer 9. Thereby the faulty grid-side inverter 5a is disabled. This activity, initiated by the converter control system 100 is indicated by a crossed-out grid-side inverter 4a. in FIG. 4 To prevent an overcurrent being fed to the other grid-side inverters, especially the other grid-side inverter 5b of the positive converter string 15, a generator-side inverter of this converter string 15, namely generator-side inverter 4a, is also disabled in response to the fault of the grid-side inverter 5a, indicated by the generator-side inverter 4a being crossed-out with dashed lines in FIG. 4. The generator-side inverter 4a is disabled by opening a generator-side circuit breaker 12 connecting this generator-side inverter 4a to the generator.

By disabling the generator-side inverter 4a and the grid-side inverter 5a the maximum active power-output of the positive converter string 15 is reduced by 50% of the original maximum active power-output of that converter string 15. As the negative converter string is still capable of performing conversion operation at maximum active power-output, the active-power-output of both converter strings 15, 16 is now unbalanced, when operating both converter strings at their respective maximum active power-output or, more generally, when operating the negative converter string at more than 50% of the maximum active power-output of the negative converter string, while operating the positive converter string at only 50% of the maximum active power-output of the positive converter string (as it is impossible to operate this converter string 15 at higher active power-outputs). A current flow in both converter strings is indicated in FIG. 4 by dashed arrows in the positive converter string 15 and in the negative converter string 16. The current flow in the negative converter string 16 is higher, therefore the dashed arrow indicating this current flow is thicker.

Hence, a compensation current 90 along the center-line conductor 18c occurs due to this unbalanced active power-output going along with such a current flow. The center-line conductor 18c has a cross-section that is dimensioned to carry the compensation current 90 as the cross-section was chosen to be 50% of the cross-section of the positive and negative potential conductor 17c, 19c.

Figure 5:
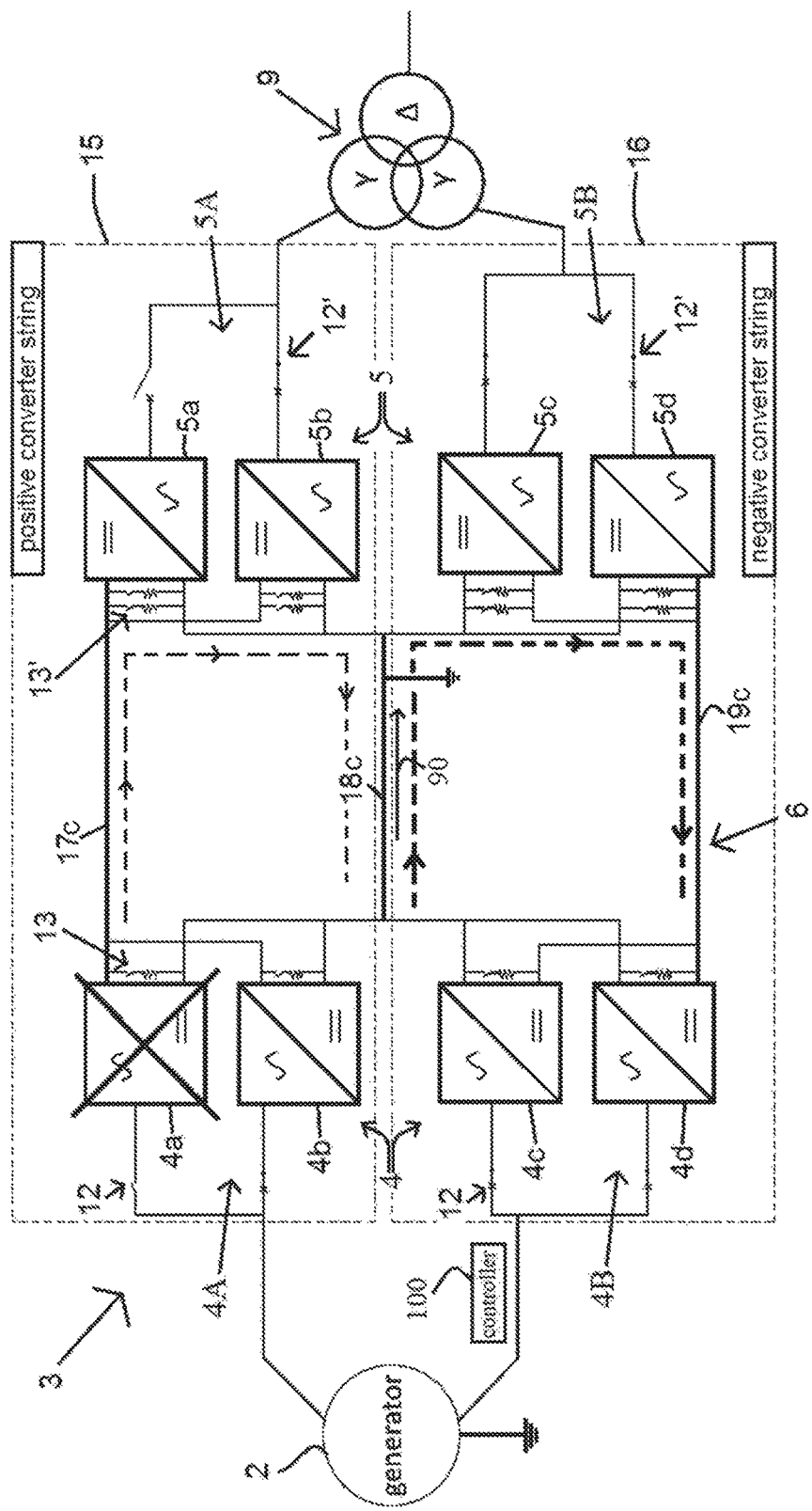
FIG. 5 is a schematic circuit diagram of the full-scale converter of FIG. 3, with a faulty and disabled generator-side inverter and grid-side inverters kept online.

Another exemplary reaction of the converter system 3 to a fault of a generator-side inverter 4a of the positive converter string 15 is shown in FIG. 5. The converter controller 100 is programmed to disable the generator-side inverter 4a by disconnecting the generator-side inverter 5a from the generator 2 using an associated generator-side circuit breaker 12, indicated by the crossed-out generator-side inverter 4a. The grid-side inverters 5a, 5b of the positive converter string 15, in which the fault occurred, are kept online by the converter system controller 100 to enable them to continue producing reactive power. Also due to the fault of the generator-side inverter 4a, a compensation current 90 occurs as described in conjunction with FIG. 4, when the negative converter string is operated at a higher active power-output than the now reduced maximum active power-output of the positive converter string in which the fault of generator-side inverter 4a occurred.

In the event of a fault of a generator-side inverter 4a, also a grid-side inverter 5a or 5b can be disabled in response to the fault of the generator-side inverter (not shown in FIG. 5). This activity of disabling a generator-side and a grid-side inverter of a converter string in the event of only a fault of one of the grid-side inverters 5a, 5b, 5c, 5d or the generator-side inverters 4a, 4b, 4c, 4d, is carried out in analogy to the activity described in conjunction with FIG. 4.

Figure 6:
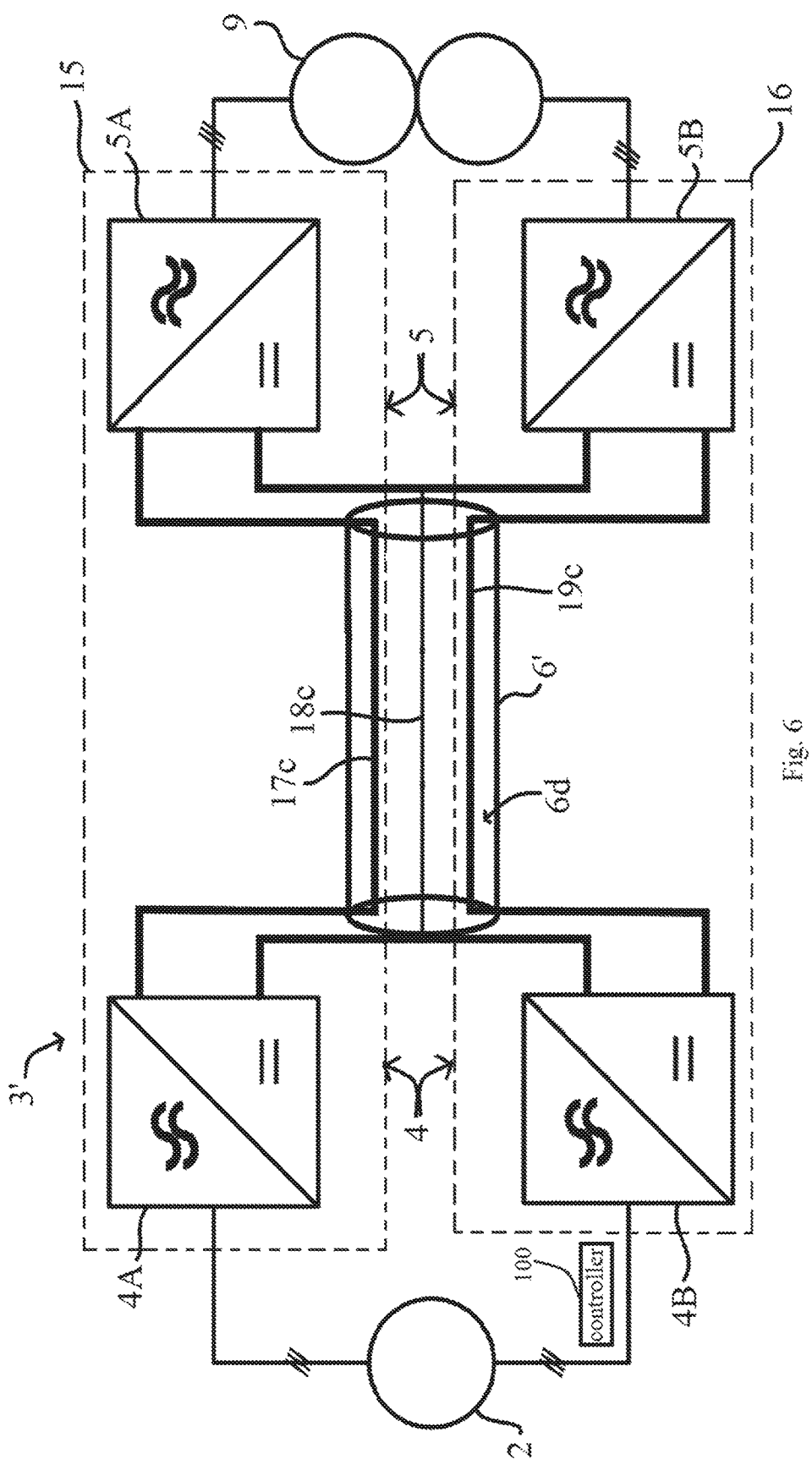
FIG. 6 is a schematic illustration of the full-scale converter with a DC-link formed by positive potential-, negative potential- and a center-line conductor.

The DC-link 6 of the full-scale converter 3' shown in FIG. 6, the generator-side and grid-side inverter units of which correspond to the converter units described in conjunction with FIGS. 2 and 3, is realized as a DC-link cable 6'. The DC-link cable 6' is formed by the positive potential conductor 17c, the center-line conductor 18c and the negative potential conductor 19c embedded within a common insulation layer 6d. The positive potential conductor and the negative potential conductor are copper cores of the DC-link cable 6' having a cross-section dimensioned such as to carry a 4 kA current, whereas the center-line conductor is also a copper core of said DC-link cable 6', having a cross-section dimensioned such as to carry a 2 kA current. Thereby, also in this example given by FIG. 3, the cross-section of the center-line conductor is the cross-section of the positive and negative potential conductor divided by two.

Figure 7:
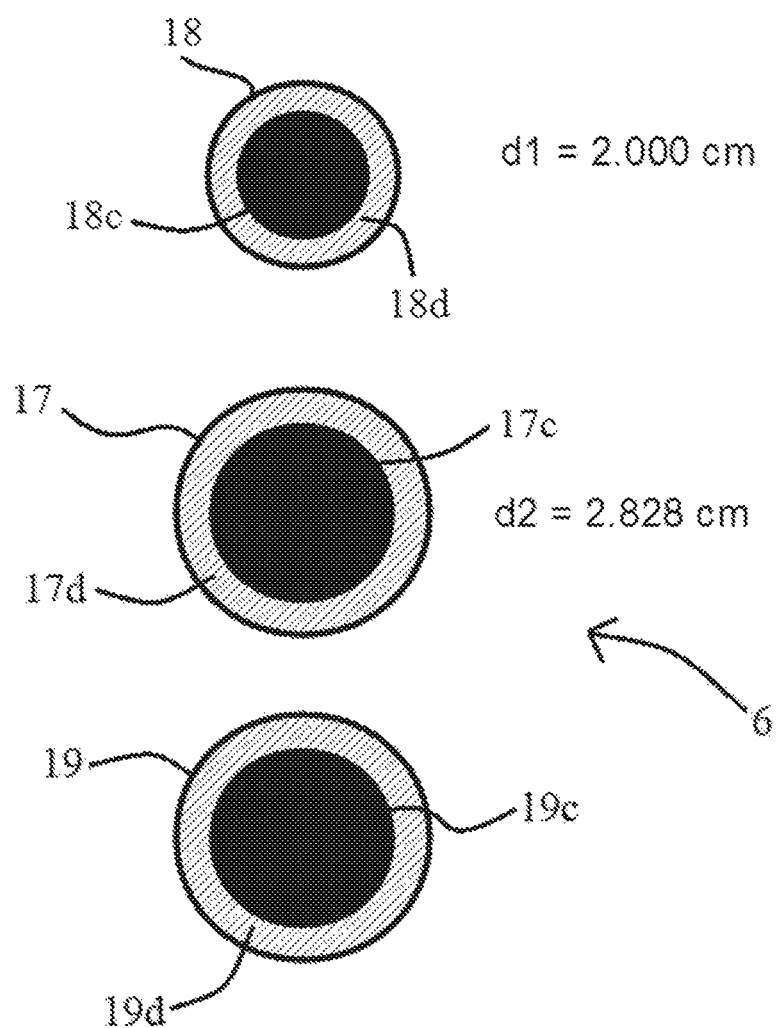
FIG. 7 schematically illustrates separate positive potential, negative potential and center-line conductor with separate insulation layers.

A slice-view of an exemplary DC-link 6 with separated DC-link cables as illustrated in FIG. 2, is illustrated in more detail in FIG. 7. This exemplary DC-link is formed by three cables, namely the positive potential DC-link cable 17, the negative potential DC-link cable 19 and a center-line cable 18. The positive potential DC-link cable 17 has a cable core that serves as the positive potential conductor 17c. This cable core is surrounded by an insulation layer 18d. Likewise the negative DC-link cable 19 has a cable core that serves as the negative potential conductor 19c. This cable core 19c is surrounded by an insulation layer 19d. The diameter d2 and thereby the cross-section of the positive and the negative potential conductor are equal.

Since the diameter of both the positive and negative potential conductors 17c, 19c is 2.828 cm, the cross-section of these conductors is 6.283 cm². The diameter d1 of the center-line conductor is, however only 2.000 cm and thereby the cross-section of the center-line conductor is 3.142 cm², i.e. approximately half of the positive conductor's cross-section and also half of the equally built negative conductor's cross-section. The cross-section 6.283 cm² of the positive and negative potential conductor is sufficient to carry a 4 kA current at a DC-link voltage of 1000V along a cable core of a length of 130 m, when assuming an admissible voltage drop along the cable of approximately 3%, when calculating the cross-section according to the formula given by the formula $$A = \frac{2LI}{\kappa U}$$

wherein, L is the length of the DC-link [m], I is the expected compensation current [A], U is the maximum admissible loss of DC-link voltage of the converter-string [V], and κ is the specific conductivity of copper [56 m/Ω mm²] and the result A is the cross-section [mm²].

This formula can also be found in the general description part.

Figure 8:
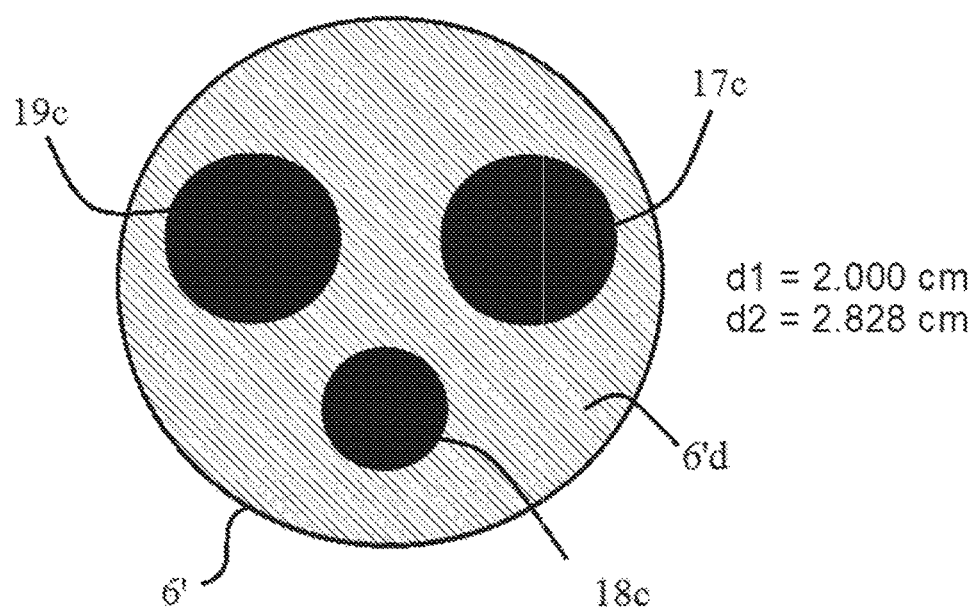
FIG. 8 schematically illustrates a positive potential, negative potential and center-line conductor embedded in a common insulation layer, with a single cable core serving as the positive potential conductor and a single cable core serving as the negative potential conductor.

A slice-view of an exemplary DC-link cable 6' comprised by the DC-link 6 (not shown) is formed by the positive-, the negative- and the center-line conductor 17c, 19c, 18c surrounded by a common insulation layer 6'd, as illustrated in FIG. 4, is given by FIG. 6. As for FIG. 8, the diameter of the positive and negative potential conductor, each represented by a single cable-core, is 2.828 cm, whereas the diameter of the center-line conductor is 2.000 cm.

Figure 9:
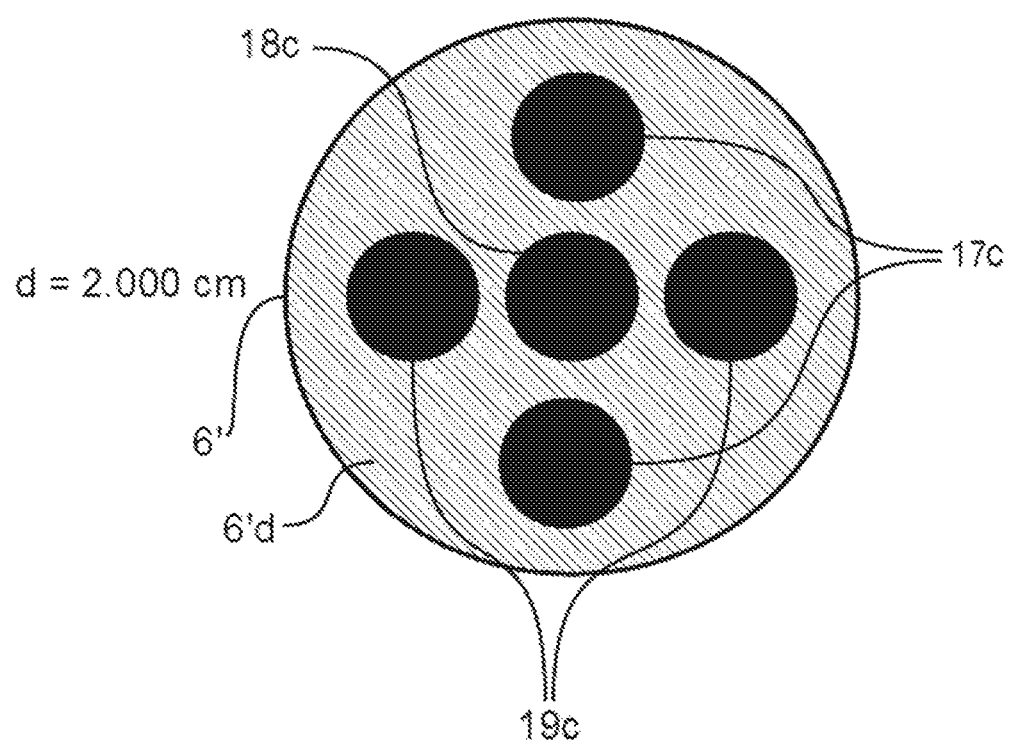
FIG. 9 schematically illustrates a positive potential, negative potential and center-line conductor embedded in a common insulation layer, with two cable cores serving as the positive potential conductor and two cable cores serving as the negative potential conductor.

A slice view of another exemplary DC-link cable 6' is shown in FIG. 9. The positive potential conductor 17c is realized as two cable-cores with 2.000 cm diameter. Also the negative potential conductor 19c is realized as two cable-cores with 2.000 cm diameter. Thereby the overall cross-section of the positive potential conductor 17c, in this example the addition of the cross-section of both cable-cores of the positive potential conductor is 6.283 cm², as each cable core of the positive potential conductor 17c has a cross-section of 3.142 cm². Same applies to the negative potential conductor 19c. The center-connection line 18c has the same cross-section as one of the two cable-cores that serve as the positive potential conductor and thereby 50% of the cross-section of the total positive potential conductor 17c. Hence, the center connection line is capable of carrying a compensation current that occurs if, for example, one out of two equally built generator-side inverters of the positive converter string, connected to the grid-side inverters of the grid-side inverter unit via the positive potential conductor 17c, suffers a fault. This compensation current, is at maximum half of a current transported by the positive potential conductor 17c, when performing conversion operation at a rated power-output.

Although certain products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

The invention claimed is:

1. A full-scale converter system for converting active power produced by a generator of a variable speed wind turbine to be fed to an electricity-grid, the converter system comprising:
    a converter system controller;
    a grid-side inverter unit, comprising a first plurality of inverters connected in parallel with each other and a second plurality of inverters connected in parallel with each other, wherein the first plurality of inverters is connected in series to the second plurality of inverters and defines a grid-side voltage-center-point between the first plurality of inverters and the second plurality of inverters;
    a generator-side inverter unit, comprising a third plurality of inverters connected in parallel with each other and a fourth plurality of inverters connected in parallel with each other, wherein the third plurality of inverters is connected in series to the fourth plurality of inverters and defines a generator-side voltage-center-point between the third plurality of inverters and the fourth plurality of inverters;
    wherein the first plurality of inverters is connected to the third plurality of inverters on respective DC sides via a positive potential conductor having a first cross-sectional area to form a first converter string;
    wherein the second plurality of inverters is connected to the fourth plurality of inverters on respective DC sides via a negative potential conductor having a second cross-sectional area to form a second converter string;
    wherein the grid-side inverter unit at the grid-side voltage-center-point is connected to the generator-side inverter unit at the generator-side voltage-center-point by a center-line conductor, which has a third cross-sectional area between 30% and 70% of a smaller of the first cross-sectional area and the second cross-sectional area; and
    wherein the converter system controller, in the event of a fault of a first inverter of the first converter-string, continues conversion operation with remaining non-faulty inverters of the first converter-string and the second converter-string by carrying a compensation current resulting from an unbalanced active power-output between the first converter-string and the second converter-string over the center-line conductor.

2. The full-scale converter system of claim 1, wherein the converter system controller is programmed to second inverter of the first inverter string that is non-faulty and included in a different plurality of the first plurality of inverters and the third plurality of inverters than the first inverter.

3. The full-scale converter of claim 1, wherein the converter system controller is programmed to disable a generator-side inverter by disconnecting the generator-side inverter from the generator and to disable a grid-side inverter by disconnecting the grid-side inverter from a transformer by circuit breakers.

4. The full-scale converter of claim 3, wherein the full-scale converter is provided with fuses in addition to the circuit breakers.

5. The full-scale converter of claim 1, wherein the third cross-sectional area is dimensioned to be 50% of the smaller of the first cross-sectional area and the second cross-sectional area; and
wherein the converter system controller is programmed to continue conversion operation in the event that up to 50% of the inverters of the first plurality of inverters are faulty, wherein conversion operation is continued with a maximum conversion capability of the remaining non-faulty inverters.

6. The full-scale converter of claim 1, wherein the center-line conductor is a copper core of a cable with a fourth cross-sectional area dimensioned to carry the compensation current.

7. The full-scale converter of claim 6, wherein the cable comprises an insulation layer, surrounding the copper core.

8. The full-scale converter of claim 1, wherein the positive potential conductor and the negative potential conductor are copper cores of at least one cable comprising insulation layers surrounding the copper core of the at least one cable, wherein the insulation layers of the negative potential conductor, the positive potential conductor and the center connection line are spatially separated from each other, such that the corresponding cables of the full-scale converter are routed separately from each other from the generator-side inverter unit to the grid-side inverter unit.

9. The full-scale converter of claim 8, wherein the positive potential conductor, the negative potential conductor and the center connection line are embedded in a common insulation layer.

10. The full-scale converter of claim 1, wherein the first cross-sectional area and the second cross-sectional area are equal.

11. The full-scale converter of claim 1, wherein the generator-side inverter unit is arranged in a nacelle of the wind turbine and the grid-side inverter unit is arranged at a base of a tower of the wind turbine.

12. The full-scale converter of claim 1 wherein the converter system controller is programmed to cause the full-scale converter to dissipate power produced by a generator-side inverter of a given converter-string in response to a fault of a grid-side inverter of the given converter-string, when disabling a generator-side inverter of the given converter-string.

13. The full-scale converter of claim 12, wherein the power produced by the generator is dissipated by energy-dissipation units that are located in the positive potential conductor and the negative potential conductor.

14. The full-scale converter of claim 1, wherein the converter system controller is programmed to disable only generator-side inverters of a given converter-string in the event of a fault of at least one generator-side inverter of the given converter-string, while keeping grid-side inverters of the given converter-string in operation to enable reactive-power production by the grid-side inverters.

15. A method of controlling a full-scale converter system for converting active power produced by a generator of a variable speed wind turbine to be fed into an electricity-grid, the converter system comprising:
a grid-side inverter unit, comprising a first plurality of inverters connected in parallel with each other and a second plurality of inverters connected in parallel with each other, wherein the first plurality of inverters is connected in series to the second plurality of inverters and defines a grid-side voltage-center-point between the first plurality of inverters and the second plurality of inverters; and
a generator-side inverter unit, comprising a third plurality of inverters connected in parallel with each other and a fourth plurality of inverters connected in parallel with each other, wherein the third plurality of inverters is connected in series to the fourth plurality of inverters and defines a generator-side voltage-center-point between the third plurality of inverters and the fourth plurality of inverters;
wherein the first plurality of inverters is connected to the third plurality of inverters on respective DC sides via a positive potential conductor of a first cross-sectional area to form a first converter-string;
wherein the second plurality of inverters is connected to the fourth plurality of inverters on respective DC sides via a negative potential conductor of a second cross-sectional area to form a second converter-string;
wherein the grid-side inverter unit at the grid-side voltage-center-point is connected to the generator-side inverter unit at the generator-side voltage-center-point by a center-line conductor that has a third cross-sectional area between 30% and 70% of a smaller of the first cross-sectional area or the second cross sectional area, wherein the method comprises:
in response to a fault of a first inverter of the first converter-string:
carrying a compensation current resulting from unbalanced active power-output caused by the fault via the center-line conductor; and
continuing conversion operations.

16. The method of claim 15, wherein continuing the conversion operations further comprises:
disabling a second inverter of the first converter-string that is non-faulty and included in a different plurality of the first plurality of inverters and the third plurality of inverters than the first inverter.

* * * * *